Dec. 12, 1933.  W. B. FENN  1,938,821
METHOD AND MEANS FOR VACUUMIZING, STERILIZING, AND SEALING CONTAINERS
Filed Feb. 9, 1929  13 Sheets-Sheet 1

Inventor
William B. Fenn
By his Attorneys Daly & Daly

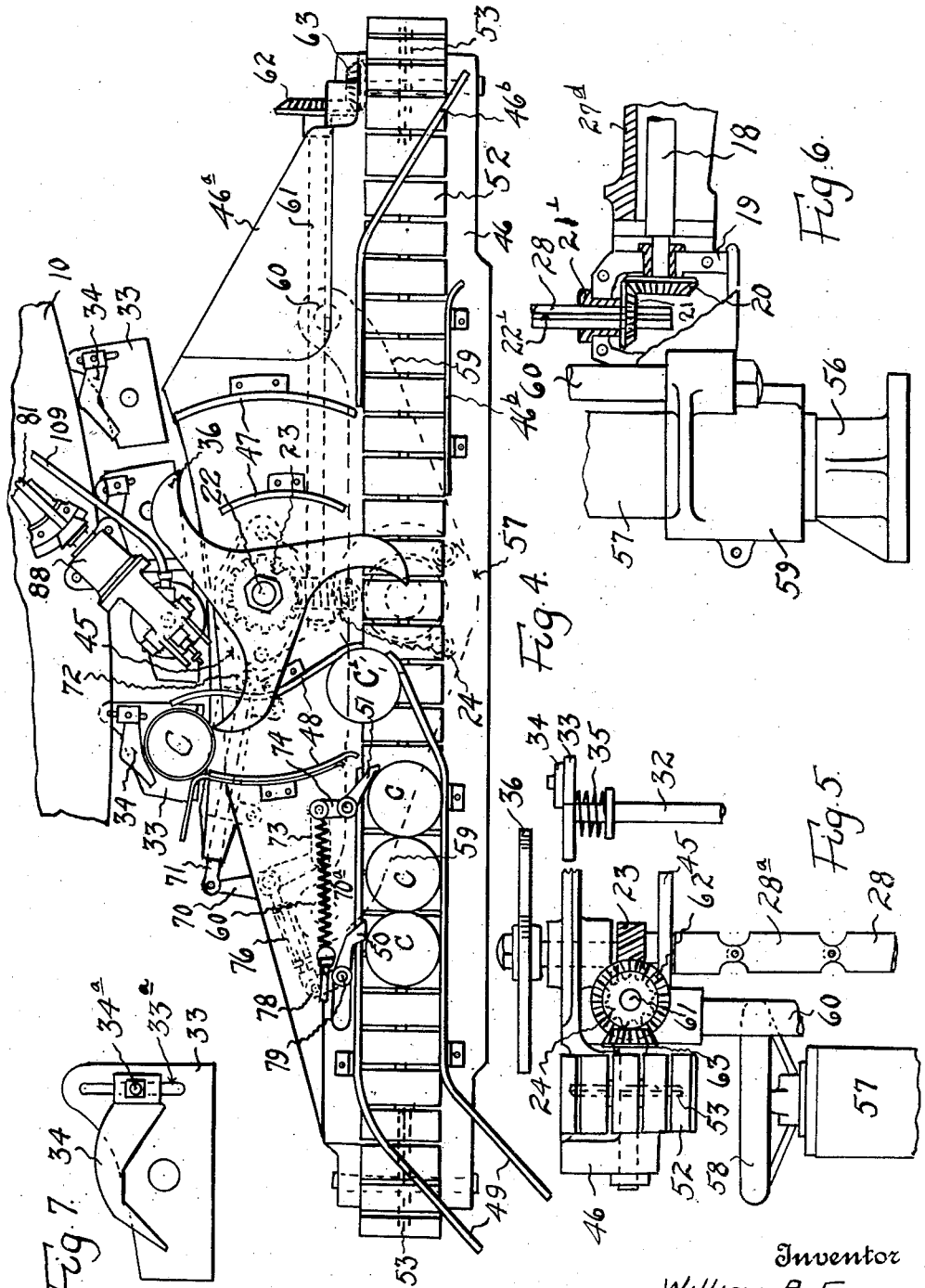

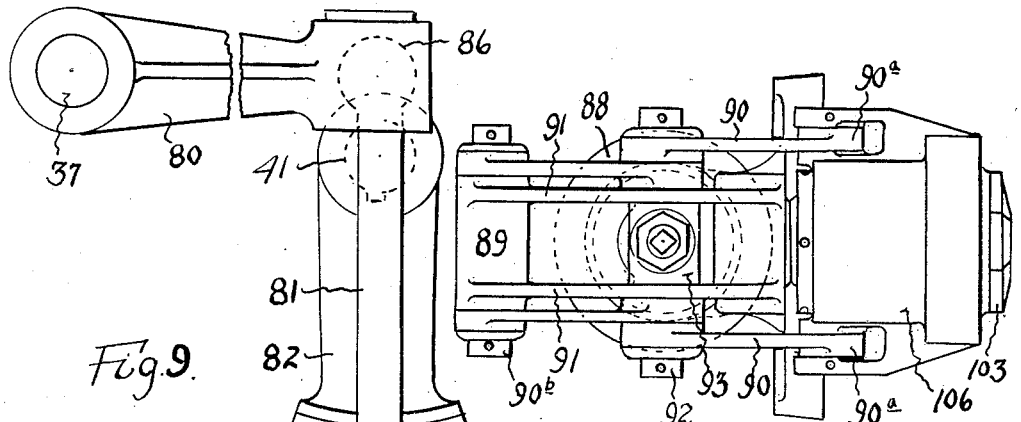
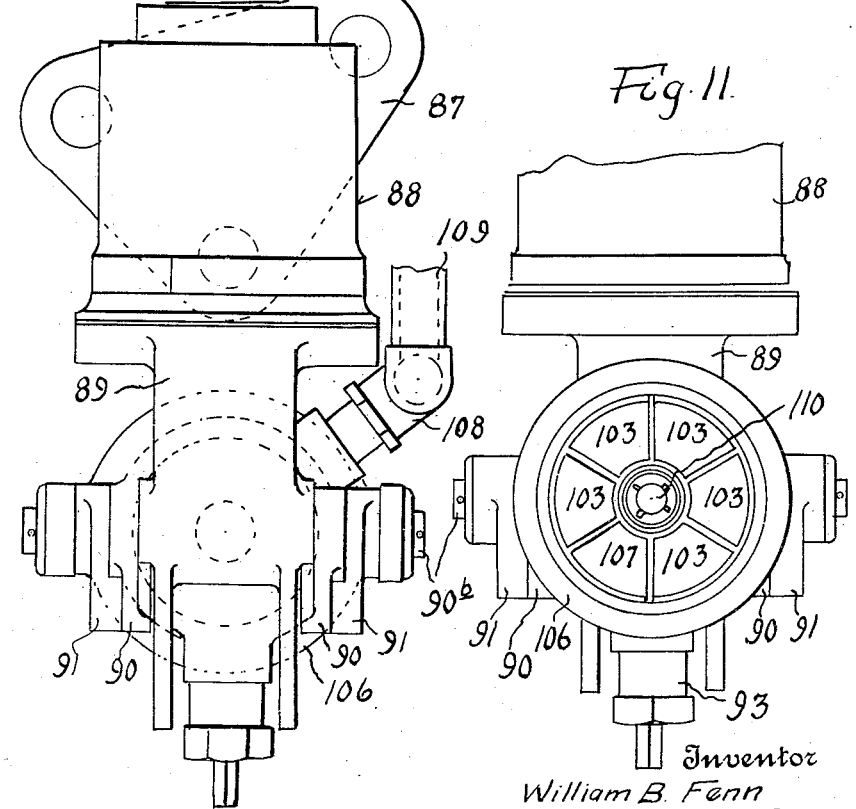

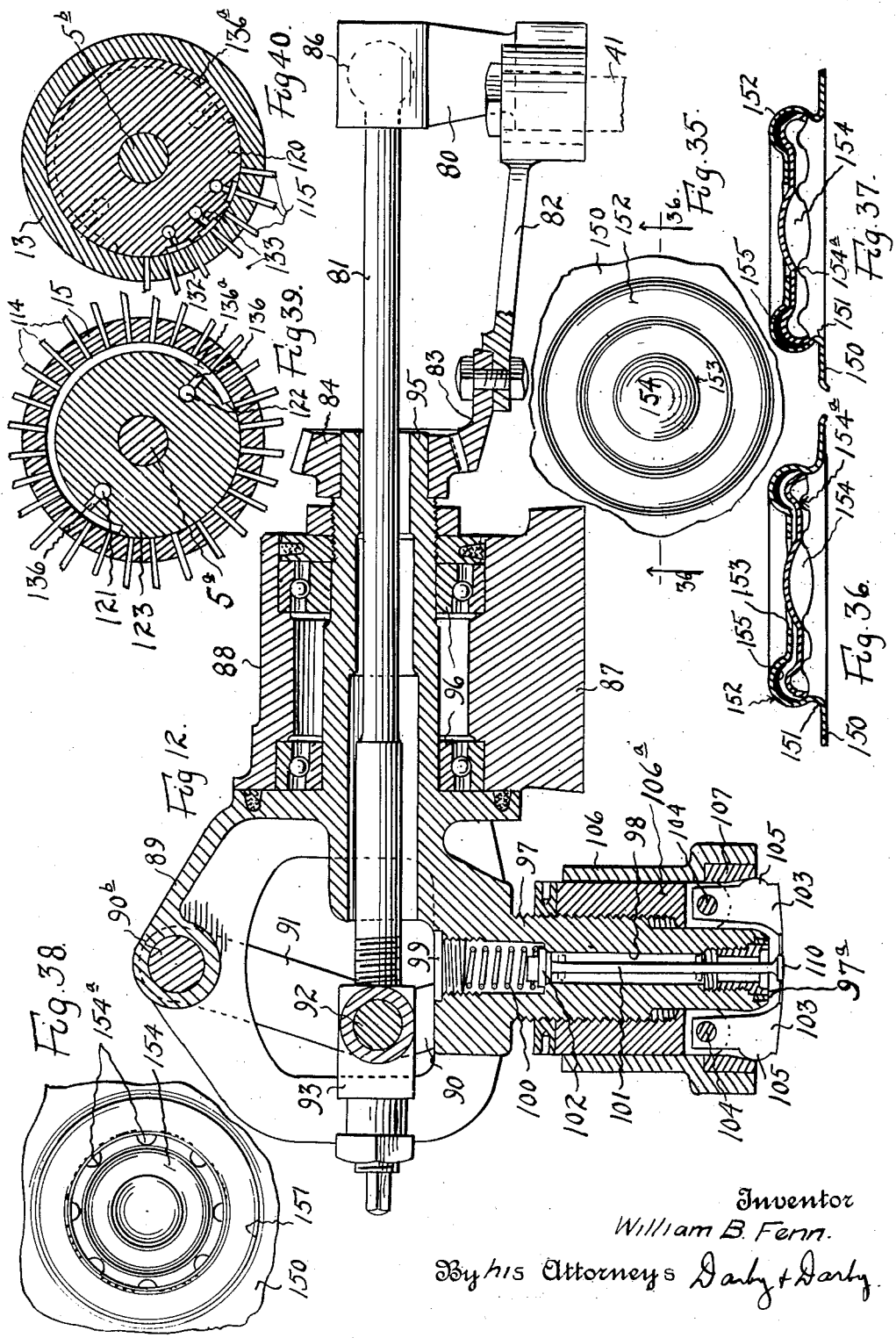

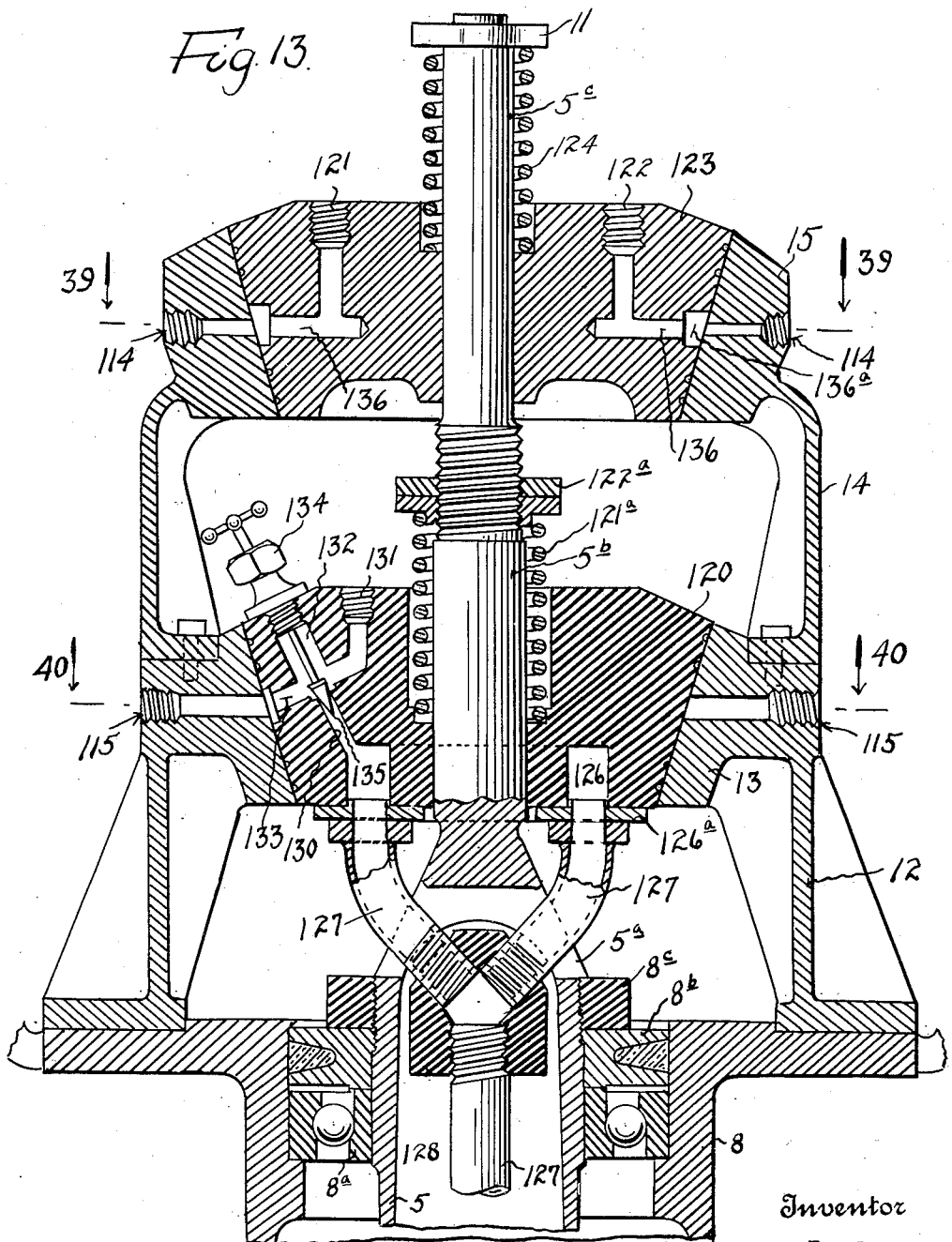

Dec. 12, 1933.                W. B. FENN                   1,938,821
    METHOD AND MEANS FOR VACUUMIZING, STERILIZING, AND SEALING CONTAINERS
                  Filed Feb. 9, 1929        13 Sheets-Sheet 8

Inventor
William B Fenn
By his Attorneys Darby & Darby

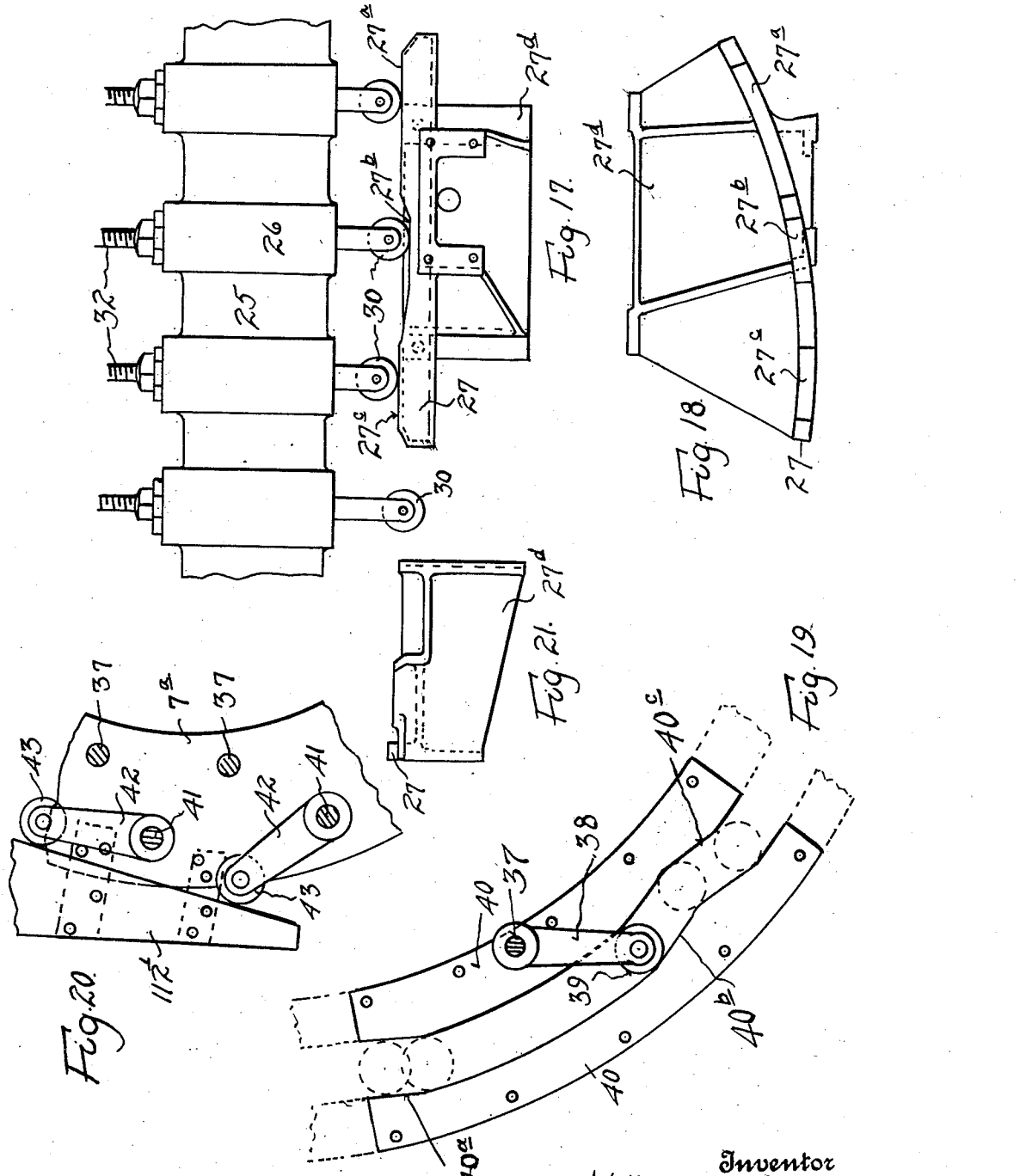

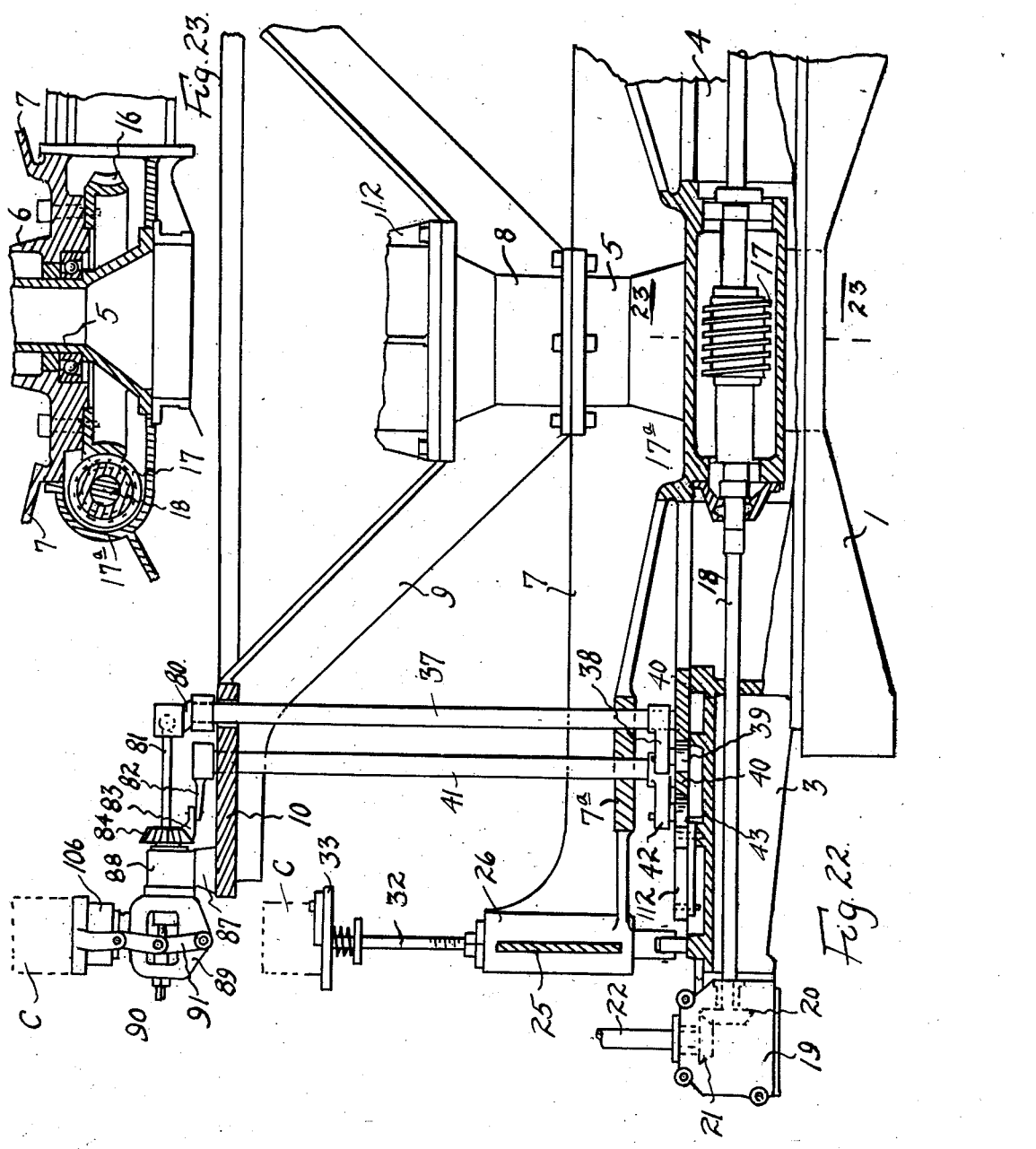

Dec. 12, 1933.      W. B. FENN      1,938,821
METHOD AND MEANS FOR VACUUMIZING, STERILIZING, AND SEALING CONTAINERS
Filed Feb. 9, 1929      13 Sheets-Sheet 11
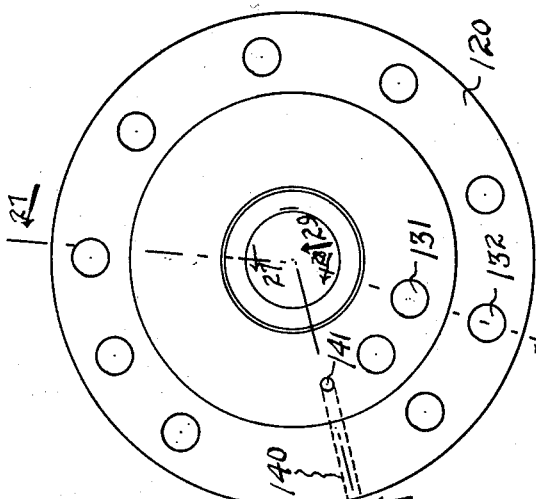
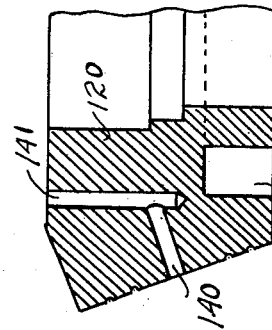
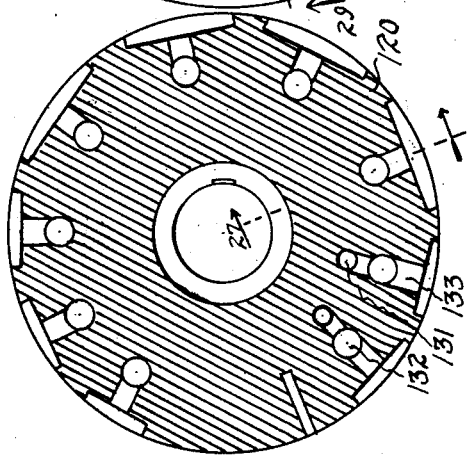
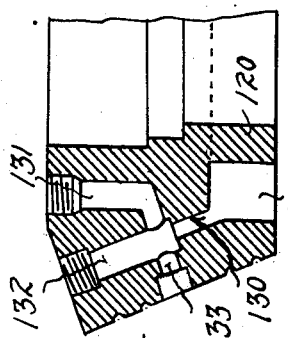
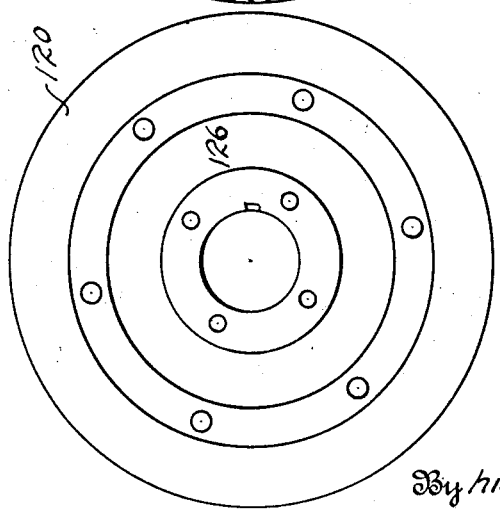
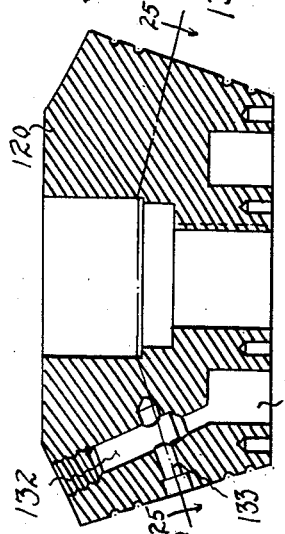
Inventor
William B. Fenn
By his Attorneys Darby & Darby

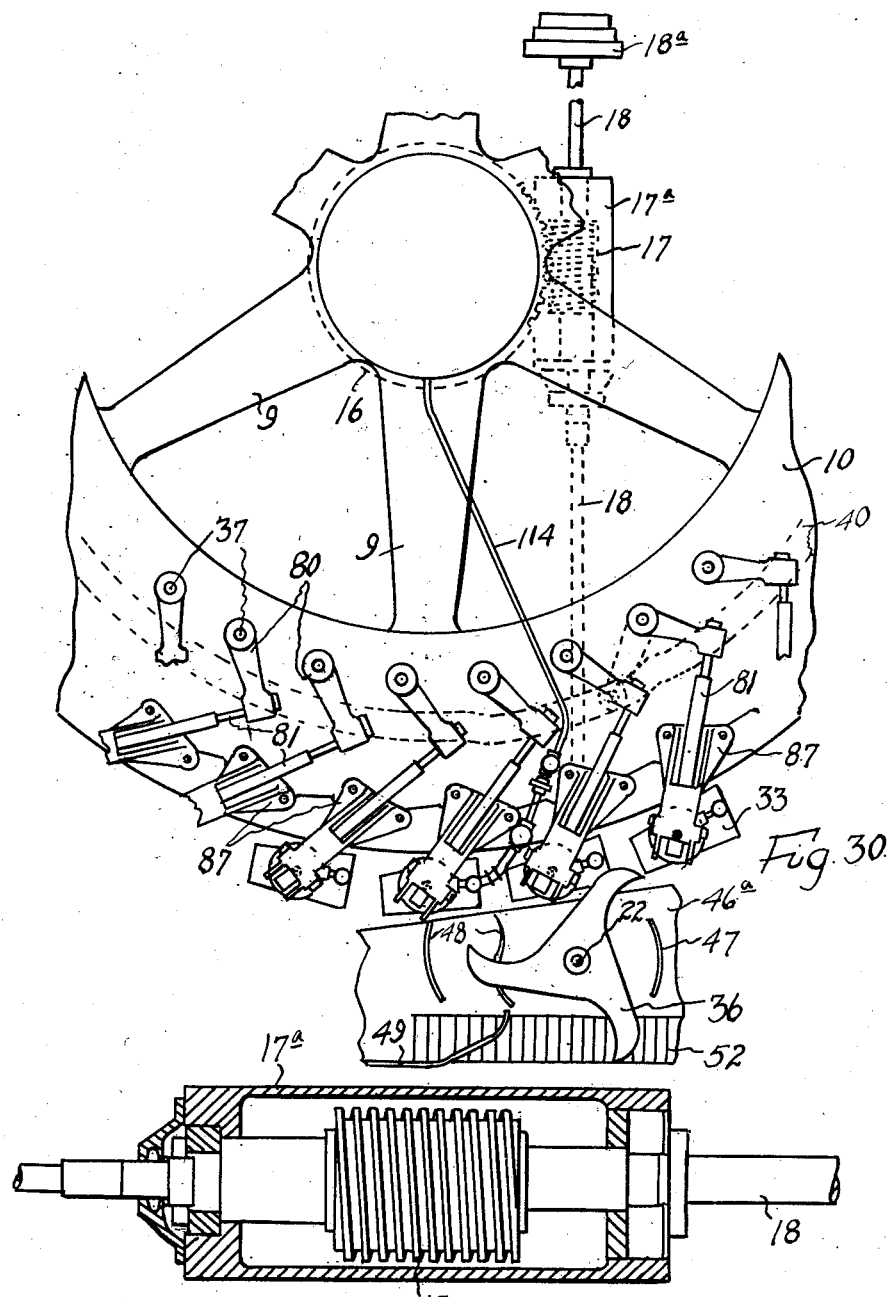

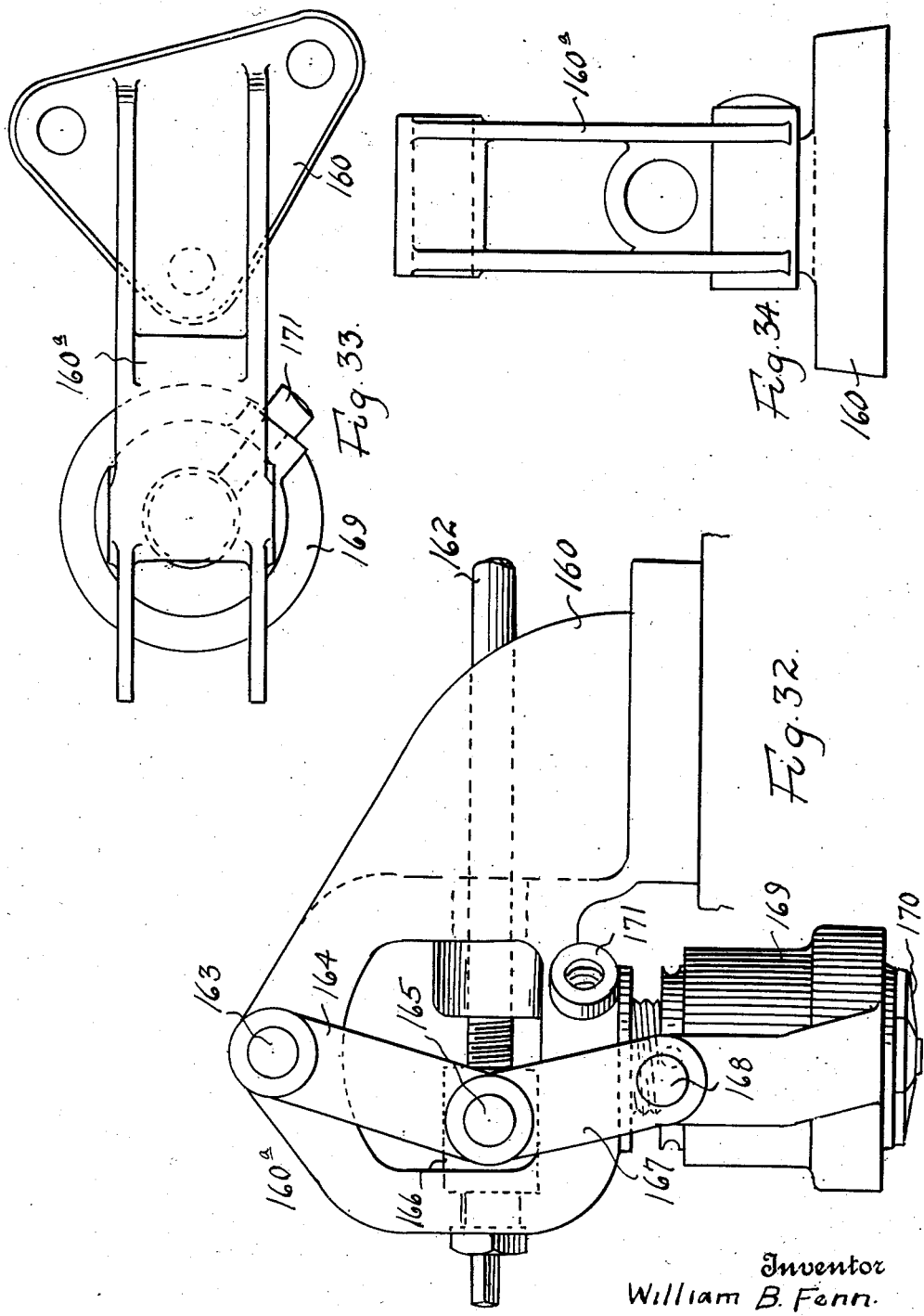

Patented Dec. 12, 1933

1,938,821

UNITED STATES PATENT OFFICE 1,938,821

METHOD AND MEANS FOR VACUUMIZING, STERILIZING, AND SEALING CONTAINERS

William B. Fenn, Port Washington, N. Y., assignor to Margaret F. Fenn, Port Washington, N. Y.

Application February 9, 1929. Serial No. 338,681

35 Claims. (Cl. 226—68)

This invention relates in general to a method of vacuumizing, sterilizing and sealing containers holding perishable products and a machine by means of which these operations may be carried out reliably and at a high rate of speed.

In general, with regard to the method, the object is to vacuumize and sterilize the contents of containers and seal the containers in a novel manner and at a rapid rate.

With regard to the apparatus, one object is to provide a machine by means of which valved metal containers may be processed in accordance with the method of procedure of this invention in a continuous and rapid manner.

Another object of the invention is the provision of a method by means of which valved containers may be vacuumized and filled with any suitable gas.

One of the objects of the invention is to provide a mechanism by means of which the containers may be fed one at a time to the machine for vacuumizing, sterilizing and sealing the containers.

Another object of this invention is the provision of a machine adapted to receive the containers from the feeding mechanism one at a time upon separate platforms provided therefor.

Another object of the invention is to provide mechanism for raising the platforms vertically to force the valves of the containers into a head which grips them.

Another object of the invention is the provision of mechanism by means of which the containers are vacuumized after they are gripped by the heads.

Another object of this invention is the provision of mechanism by means of which the containers are inverted after they are vacuumized and before they are supplied with a sterilizing medium which is sealed in the containers at any desired pressure.

A still further object of the invention is the provision of apparatus by means of which the containers are returned to their original position after they are sterilized and sealed.

A further object of the invention is the provision of mechanism of the above type by means of which the operations are carried out in an orderly sequence and at a high rate of speed.

These and numerous other objects, as will appear from the following disclosure, are secured by means of this invention.

This invention resides substantially in the combination, construction, arrangement, relative location of parts, steps and series of steps, all as will be set forth in great detail below.

The drawings show a number of figures which are briefly described as follows:

Fig. 4 is an enlarged top plan view of the feeding mechanism;

Fig. 5 is an enlarged detail view with many parts broken away showing the end of the feeding mechanism;

Fig. 6 is an enlarged detail view showing the driving connection of the feeding mechanism;

Fig. 7 is an enlarged top plan view of one of the platforms which receive the containers from the feeding mechanism;

Fig. 8 is an enlarged detail view of a portion of the belt of the feeding mechanism;

Fig. 9 is an enlarged top view of one of the heads of the type which rotates;

Fig. 10 is an end elevational view of Fig. 9 showing the head;

Fig. 11 is a bottom plan view of the chuck of the head of Fig. 9;

Fig. 12 is a longitudinal cross-sectional view through one of the heads of the type which rotates;

Fig. 13 is a vertical cross sectional view through the valves which control the vacuumizing, sterilizing, and gassing operations;

Figs. 17, 18 and 21 are various views of the cam and its relation to the vertically movable shafts by means of which the individual platforms are raised at the proper time;

Fig. 19 is a plan view of the cams and their relation to the arm by means of which the chucks in the heads are operated to grip the containers;

Fig. 20 is a top plan view of the cam and its relation to the levers which operate the mechanism for rotating the heads to invert the cans;

Fig. 22 is a cross-sectional view through a part of the frame of the machine showing the relation between the heads and platforms and the mechanism for operating the heads and platforms and the relation of the main power drive shaft to the remainder of the apparatus;

Fig. 23 is a cross-sectional view taken on the line 23—23 of Fig. 22;

Fig. 24 is a bottom plan view of the valve which controls the vacuumizing operations;

Fig. 25 is a cross-sectional view taken on the line 25—25 of Fig. 27;

Fig. 26 is a top plan view of the vacuumizing valve;

Fig. 27 is a cross-sectional view taken on the line 27—27 of Fig. 25 or Fig. 26;

Fig. 28 is a cross-sectional view taken on the line 28—28 of Fig. 26;

Fig. 29 is a cross-sectional view taken on the line 29—29 of Fig. 26;

Fig. 30 is an enlarged plan view of a portion of the machine showing the operative relationship between the driving mechanism, a number of the heads and the feeding mechanism;

Fig. 31 is a longitudinal cross-sectional view through the housing for the worm wheel;

Fig. 32 is a side elevational view of a head of the type which does not rotate;

Fig. 33 is a top plan view of this head;

Fig. 34 is a front view of the support for the head;

Fig. 35 is a top plan view of the valve employed on the container used in the machine of this invention;

Fig. 36 is a cross-sectional view taken on the line 36—36 of Fig. 35, showing the valve open;

Fig. 37 is a similar view showing the valve after it has been sealed;

Fig. 38 is a bottom plan view of the valve;

Fig. 39, taken on the line 39—39 of Fig. 13, shows the steam valve by means of which steam is fed to the container; and Fig. 40 is a cross-sectional view taken on the line 40—40 of Fig. 13, showing the vacuumizing and vapor valve.

The general purpose of this invention is the provision of an automatic machine by means of which special valved containers containing perishable products may be rapidly and accurately vacuumized, sterilized with steam, and sealed, or vacuumized and filled with gas and sealed, at or above atmospheric pressure.

The container having a valve in the top thereof has been fully disclosed in my issued Patent No. 1,728,533 dated September 17, 1929. There is also disclosed in my copending application Serial No. 327,788, filed December 22, 1928, a process for vacuumizing, sterilizing and sealing such containers. The invention of this application discloses a machine for effecting this process, when using such a container, and in addition the process of vacuumizing, gassing and sealing containers of this type.

A better understanding of the invention will be had by due reference to the construction shown in the figures which embody the principles of this invention.

Figure 1:
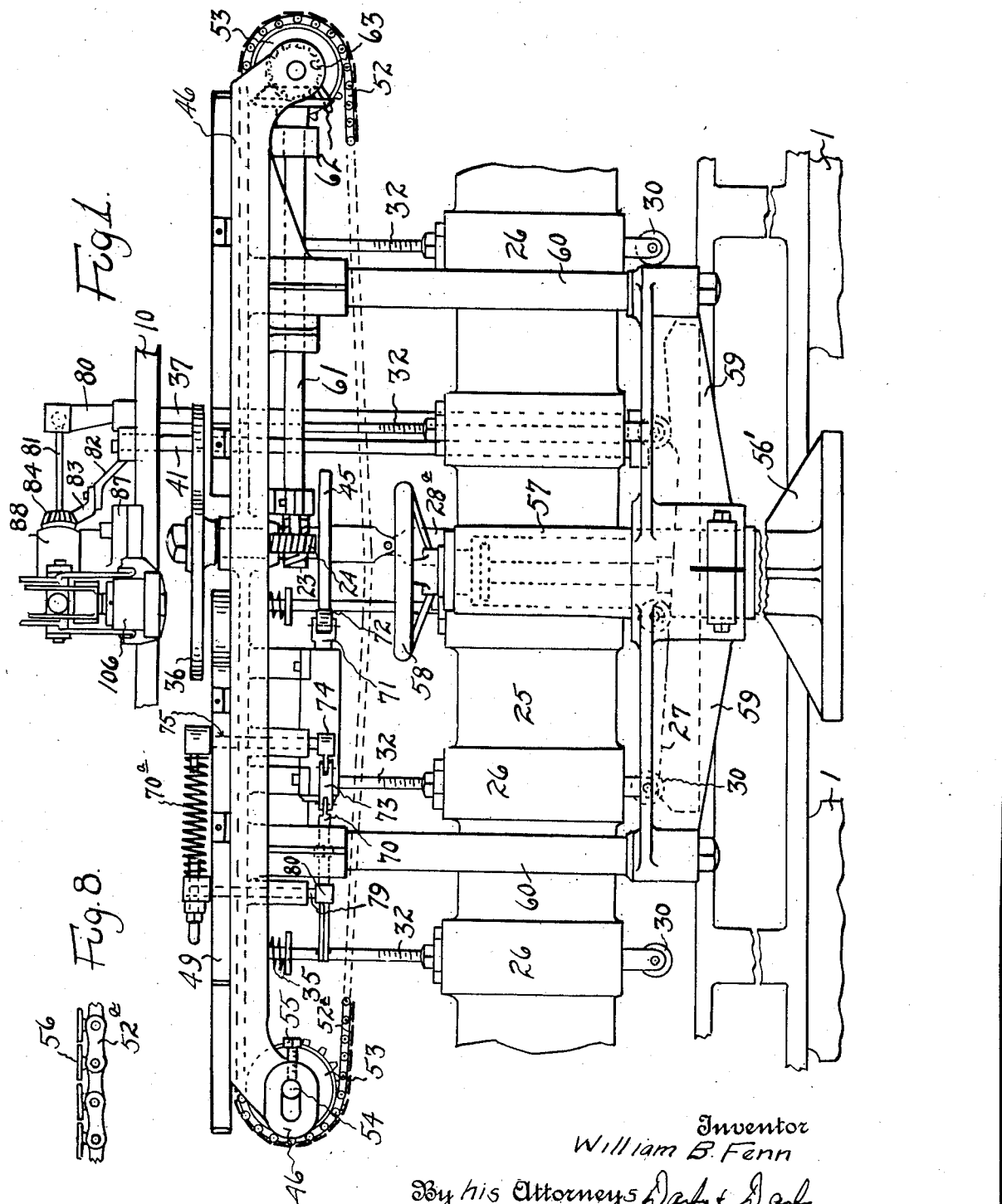
Figure 1 is a front elevational view of the mechanism for feeding the containers to the main part of the machine, showing a portion of the main part of the machine in elevation with many parts broken away.
Figure 2:
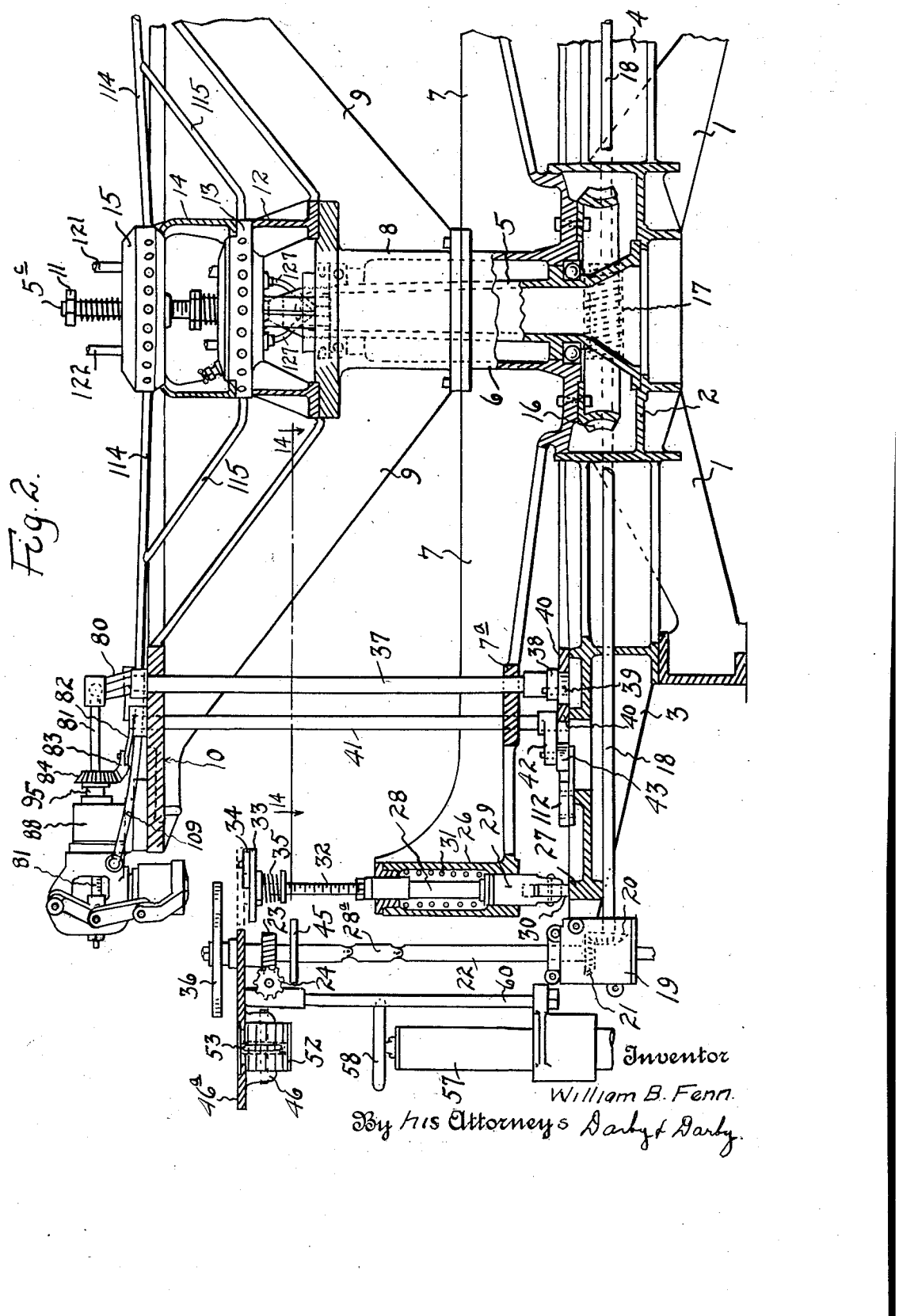
Fig. 2 is a vertical cross sectional view through the device showing the feeding means on one side and the parts broken away at the other side.

As shown in Figs. 1 and 2 the machine structure is supported on any suitable form of base plate 1 formed with the central cylindrical portion 2. The base plate is provided with the extensions 3 and 4 for supporting various parts of the machine as will be described later. 5 is a central vertical spindle supported on the base plate, which extends upwardly through a large spider comprising the central cylindrical portion 6 and the radiating arms 7. Secured to the central cylindrical portion 6 is a similar cylindrical member 8 having the radiating arms 9 extending at an acute angle with respect to the cylindrical portion 8. The upper ends of the arms 9 are united by means of annular platform or table 10 which supports various parts of the machine.

Figure 14:
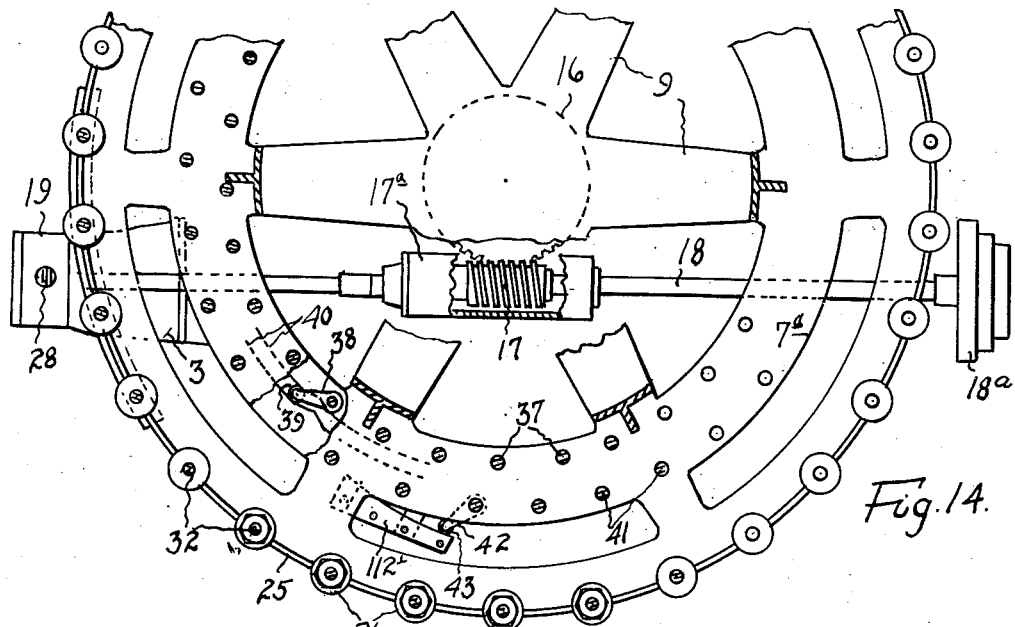
Fig. 14 is a cross-sectional view taken on the line 14—14 of Fig. 2 with some parts broken away.
Figure 15:
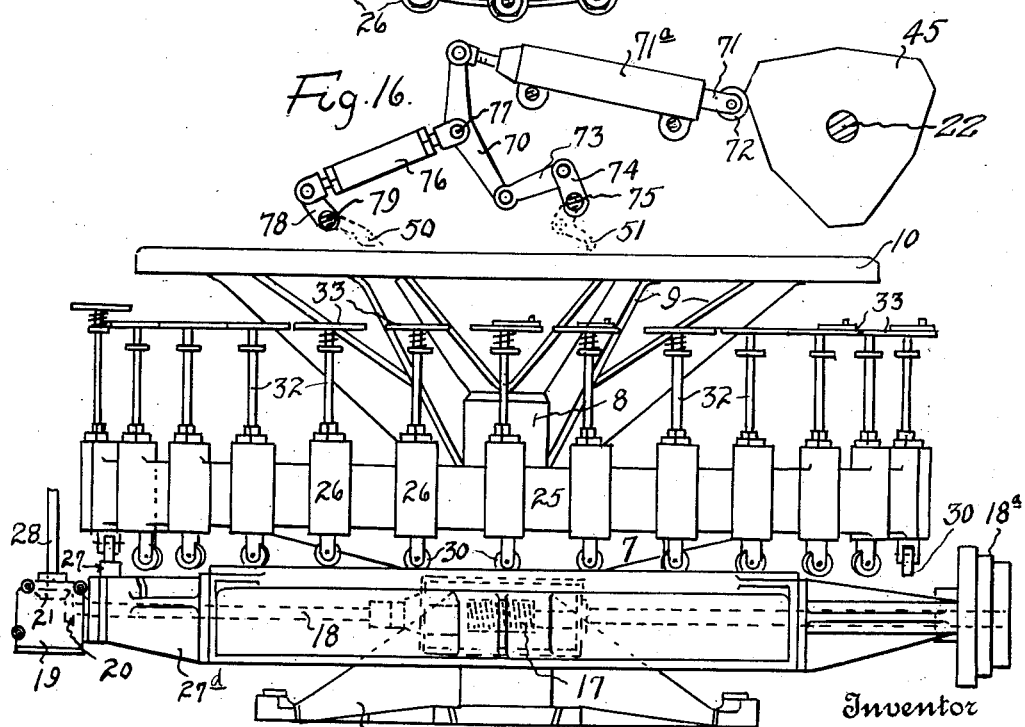
Fig. 15 is an elevational view of the device with the valves and heads removed showing the driving mechanism.

Supported on the cylindrical member 8 are cylindrical casings 12 and 14, which provide the vacuum and steam valve seats 13 and 15 shown generally in Fig. 2. Secured to the spider comprising the cylindrical portion 6 and arms 7 is a large worm gear 16 lying within the central portion 2 of the base plate. This worm gear 16 meshes with a driving worm 17 secured to the power shaft 18. One end of the power shaft is provided with the pulleys 18ª, Figs. 14 and 15. The other end of shaft 18 extends through a small housing 19 secured to the extreme end of the extension 3. The end of the shaft 18 is provided with a bevel gear 20 meshing with a similar bevel gear 21 secured to the vertical shaft 22 by means of a feather 22' (Fig. 6). The gear 21 is secured to the rotatable shell 21' journaled in casing 19, Fig. 6. The shaft 22 is provided with a universal joint section 28ª. Shaft 22 is provided with the cam 45 and a worm wheel 23 which meshes with a worm 24 mounted on the horizontal shaft 61.

The outer ends of arms 7 are united by means of a wall 25 having at intervals cylindrical hollow casings 26. Vertically slidable in the casings 26 are the rods 28 having the enlarged ends 29 in which are journaled the rollers 30. These rollers during one part of the rotation of the arms 7 contact with a cam surface 27 mounted on the extension 3. This construction is more clearly shown in Figs. 17, 18 and 21 in which the cam surface 27 is formed on the removable member 27ᵈ, which is adapted to be secured to the extension 3. The cam 7 is shown with three surfaces 27ª, 27ᵇ, and 27ᶜ.

As shown in Fig. 2, the rod 28 is encircled by means of the spring 31, which acts to force the rod 28, enlarged portion 29 and roller 30 downwardly. Secured to the upper end of rod 28 is a threaded extension 32, which may be adjusted vertically. Resiliently supported at the upper end of rod 32 is a platform 33 which may move in the extension 32 vertically against the action of spring 35. As shown in Fig. 7 the platforms 33 are provided with a slot 33ª along which may be adjusted the stop 34. This stop 34 may be held at any point on the platform by means of the nut and bolt 34ª. The purpose of this stop is to adapt the device for various sized cans. As is clearly shown in Figs. 1, 3, 14 and 15, there are a large number of these platforms all constructed in the manner just described.

The arms 7 are also united by the horizontal annular ring or web 7ª. Journalled vertically in the rings 10 and 7ª are the shafts 37 and 41. Shaft 37 is provided at its lower end with a lever 38, having a roller 39 at its outer end. This roller is adapted to lie between the two bottom members 40, Fig. 19, which are suitably shaped to oscillate the levers 38 and shafts 37 the proper distance at the proper time as will be described later. The shaft 41 is provided at its lower end with a lever 42 having a roller 43 at its outer end. As shown in Fig. 20 the rollers 43 contact with fixed cams 112 and 112' at the proper time to oscillate the levers 42 and shafts 41 the proper amount. Cams 112 and 112' are alike and are of the construction shown in Fig. 20. The only difference is that cam surface of cam 112 is inclined in the opposite direction to that of cam 112' as would obviously be necessary.

The upper end of shaft 22 is journaled in the platform member 46ª, which has the extensions 46, at each end, Fig. 1. Journaled in the left hand extension on shaft 54 is the sprocket wheel 53. The position of this sprocket wheel may be controlled by the adjusting screw 55. The other end of the platform 46 is provided with a similar sprocket wheel 53. Flexible chain 52 passes over these two sprocket wheels and is united to form an endless belt. As shown in Fig. 8, this chain comprises the links 52ª, supporting a series of small plates 56. The appearance of the chain or belt 52 is clearly shown in Fig. 4. As shown in Fig. 5, the shaft 61 is provided with a bevel gear 62 which meshes with a similar gear 63 on the same shaft with sprocket wheel 53. The platform 46 is supported on the vertical rods 60 which extend upwardly from the transverse member 59 which is supported on the base member 56, Fig. 8. The platform through the agency of rods 60 and member 59 may be controlled in its vertical height by means of hand wheel 58 which operates a shaft within casing 57, by means of which the member 59 may be moved up and down upon the shaft by means of screw-threads (not shown) as will be apparent to those skilled in the art.

Figure 3:
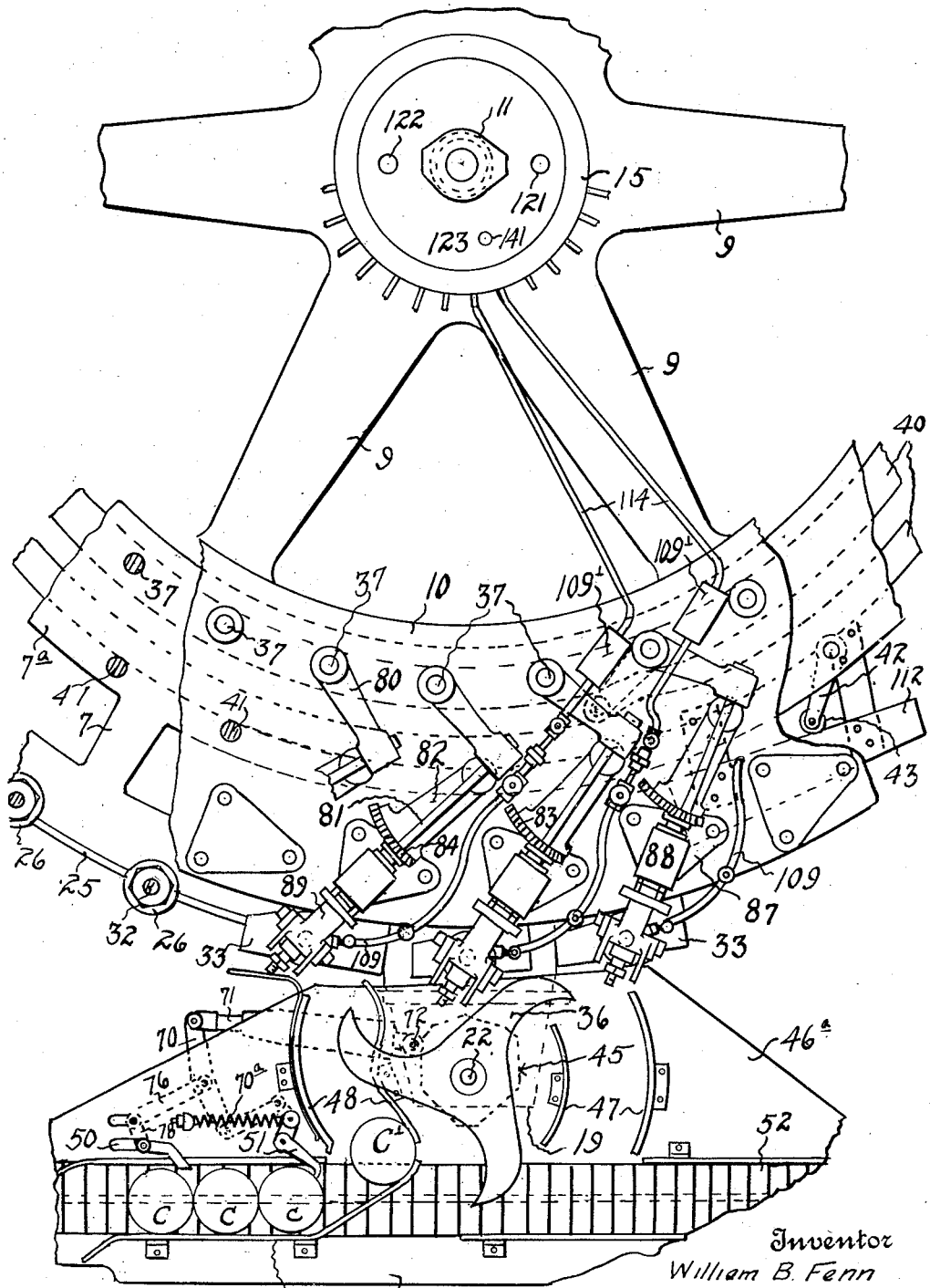
Fig. 3 is a top plan view of the mechanism at the side adjacent the feeding device with many parts broken away.

As shown in Figs. 3 and 4, the upper end of shaft 22 is provided with the star wheel 36. Mounted on the top of platform 46 are the guides 46ᵇ, 47, 48 and 49. These guides are adapted to feed the can to the proper points from and to the movable belt during the operation of the machine under the influence of the star wheel 36. As is apparent from these figures, the belt 52 moves from the left towards the right and the cans are fed to this feeding mechanism between the guides 49 by hand or in any other manner. The cans are moved by the belt until they reach pivoted stop 51. When three cans C have taken the position as shown in these figures, the last one prevents the oscillation of the pivoted stop 50 and this operates the mechanism which releases the stop 51 long enough to permit the belt to move one can to the point indicated at C', where the star wheel 36 moves it between the guides 48 and onto the platform 33 in alignment with the guide 34.

Figure 16:
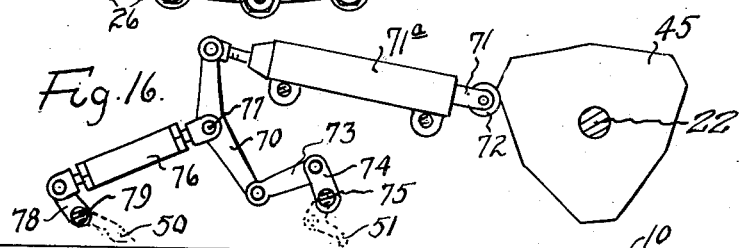
Fig. 16 is an enlarged detail view of the mechanism and drive by means of which the cans are released one at a time for delivery by the feeding device to the main part of the machine.

This mechanism for feeding the cans one at a time will now be described with particular reference to Figs. 3, 4 and 16. Stop 51 is secured to the vertical shaft 75 to which is also secured the link 74. This link 74 is pivotally connected to a link 73 which in turn is pivotally connected to the link 70. The other end of link 70 is pivotally connected to rod 71 slidably mounted within the casing 71ª. This rod 71 is provided with a roller 72 which contacts with the cam 45 mounted on shaft 22 (Fig. 2).

Pivotally connected to link 70 at 77 is a link 76 which in turn is pivotally connected to a short link 78 which in turn is secured to the shaft 79 on which the stop 50 is secured. A tension spring 70ª, Fig. 3, is secured at one end to a fixed point and at the other to lever 74. As cam 45, Fig. 16, rotates, rod 71 reciprocates back and forth causing lever 70 to oscillate on its pivot point connection to lever 74, spring 70ª being strong enough to prevent its movement. Oscillation of lever 70 causes stop 50 to oscillate until a can moves into its path. Pivot 77 then becomes fixed and cam 45 causes lever 70 to now oscillate on pivot 77 causing stop 51 to move out of the path of the first can. As the cans move forward the said third can moves out of the path of stop 50 and as a result the stop again begins to oscillate and stop 51 prevents the next can in line from being fed to the star wheel until another can moves up to engage stop 50.

As clearly shown in Fig. 2, the upper end of shaft 37 is provided with an arm 80 which is secured to the rod 81 by means of the universal joint 86, Fig. 9. Shaft 41 is provided at its upper end with the arm 82 which is secured at its outer end to a toothed arcuate piece 83, Fig. 9. The teeth of this piece mesh with the bevel gear 84. Referring to Fig. 12, it is clear that the bevel gear 84 is secured to the hollow shaft 95, which is journaled on the ball bearings 96, within the casing 88 mounted on support 87. Formed integral with the hollow shaft 95 is the bracket 89 on the top of which are journaled the two links 91 on the pivot pin 90ᵇ.

The other ends of links 91 are journaled on the pivot pin 92. This pivot pin is journaled in the block 93 secured to the end of the shaft 81, which extends through the hollow shaft 95. The links 90 are journaled at one end on the pivot pin 92 and at the other end to the sleeve 106 at 90ª, Fig. 10. Formed on the bracket 89 is a hollow threaded extension 97 which has the passage 98 therethrough. The upper end of this passage is closed by means of the plug 99, against which is seated a spring 100. The other end of spring 100 engages the valve 102 to hold it on its seat and maintain passage 98 closed. The valve 102 is provided with a rod 101 having the enlarged end 110. Mounted within the sleeve 106 is an annular ring 107 having a conical inner surface. The sleeve 106 slidably fits over the circular member 106ª, which engages the threads on extension 97. The member 106ª is provided with slotted extensions in which are pivotally mounted on the pivot pins 104 the jaws 103 of a chuck. The jaws 103 are provided with projecting cam surfaces 105, which engage with the conical inner surface of ring 107. This structure, as shown in Fig. 12, comprises what I term a head which in the form disclosed is of the rotatable type. These heads are mounted by means of the supports 87 on the platform 10 around the periphery thereof, as is clearly shown in Figs. 2 and 3, for instance. In the machine disclosed there are thirty of these heads, and as will be apparent, there is one platform 33 for each of these heads mounted directly thereunder. As shown in Fig. 9 a hollow extension 108 is secured to each head so as to open into the small chamber between plug 99 and valve 102. This extension 108 is connected by means of a flexible hose 109 to the pipe 114 through the connection means 109', as is shown clearly in Fig. 3. Pipes 114 extend to the valve casing or seat 15. Pipes 115 which connect with pipes 114 terminate in the valve casing or seat 13.

A more detailed disclosure of this valve structure has been made in Fig. 13. The other valve casings 12 and 14 are supported on the central cylindrical member 8 which is mounted on roller bearings 8ª for rotation about the central fixed spindle 5. The spindle is hollow for a part of the way, and then is provided with the slotted reduced portions 5ᵇ and 5ᶜ. The portion 5ᵇ is connected to the main hollow body by means of the conical section 5ª, which has openings to permit the passage of the pipes 127 therethrough. The vacuum valve 120 is supported in the conical seat 13 formed in casing 12. The valve 120 encircles the portion 5ᵇ and is held on the seat by means of spring 121ª and the lock nuts 122ª. Steam valve 123 which is mounted in the seat 15 of casing 14 encircles the portion 5ᶜ and is held on its seat by means of spring 124 and nut 111. It will be apparent that the casings 12 and 14 with their integral seats 13 and 15 are united together and secured to the central cylindrical part 8 for rotation with the rest of the device about the central spindle and the fixed valves 120 and 123. The ball bearings 8ª and the packing ring 8ᵇ are held on the central spindle by means of the large nut 8ᶜ. As indicated at 114 and 115 in Fig. 3, the pipes 114 and 115 are secured to the threaded openings in the valve seats. There are as many pipes 114 and 115 as there are the heads on the machine.

The valve construction is shown more completely in Figs. 24 and 29, inclusive. The bottom of valve 120 is shown in Fig. 24 having the annular groove 126, which is closed by the ring 126ª (Fig. 13) by means of which connection from pipes 127 is made to the groove. The horizontal cross-sectional view of valve 120 in Fig. 25 shows it comprising a series of vertical passages 132 connected by horizontal passages 133 to recess on the periphery of the valve. As shown in this figure two of the passages 132 are each in communication respectively with two smaller passages 131. The relative arrangement of these passages is clearly shown in Fig. 28 and Fig. 13. They are interconnected and connect with the annular groove 126 and with the passage 133 which is in the proper position to place it in alignment with the passages in valve seat 13. The passage 130 connecting groove 26 and passage 133 is controlled by the needle valve 134 (Fig. 13). This particular type of valve is adapted to be used for drawing the vacuum on the containers or for drawing a vacuum and supplying a gas to the container. The gas connections would be made to the openings 131. The vacuum is drawn through pipes 127. In the case of the valve which does not have passages 132 the construction is as shown in Fig. 27. In other words, the valve of the construction shown in Fig. 27 is adapted only for carrying out the operation of vacuumizing the container. If it is desired to both vacuumize and supply the containers with an inert gas, then a valve of the type shown in Figs. 25 and 28 is employed. In addition, it will be noted that valve 120 is provided with passage 141 extending to the atmosphere and connecting with the passage 140 which will be in alignment with the passages in the valve seat 13. The construction of valve 123 is much simpler in that it has the passages for receiving pipes 121 and 122, which are connected by the passages 136 to the large peripheral groove 136ª, extending a substantial distance around the periphery of the valve body. This groove 136ª is in position to be in alignment with the passages in valve seat 15.

The container used in connection with this machine is of the ordinary can type which is provided with a top having a raised central portion in which is mounted a floating valve. This container is described in detail in my issued Patent No. 1,728,533 noted above. A similar detailed description of the idea will be given here, however, in order that its cooperation with the elements of this machine may be more fully understood.

The valve for the container in open position is shown in Fig. 36. The top of the container 150 has the raised central portion 152. The center of the raised portion is slightly depressed and provided with a circular opening 153. Supported within the raised portion 152 is a floating valve 154, whose diameter is slightly larger than the diameter at the base of the projection at the point indicated at 151 so that the valve is prevented from falling out of the projection. A suitable sealing compound 155 is provided against which the movable part of the valve seats. The movable part of the valve is scalloped at its edge, as is indicated at 154ª, to permit the movement of gas past the valve.

It is pointed out that the center part of the valve 154 is raised so as to project through the opening 153. After the contents of the container are processed, the base portion of the projection is compressed inwardly, as indicated at 151, Fig. 37, so that the valve member 154 is pressed upwardly to seat in the sealing compound and to thereby close and seal the container. The sealed valve is clearly shown in Fig. 37.

A description of the operation of the device will now be given. Power is applied to the pulley 18ª which causes shaft 18 to revolve, as well as worm 17 and gear 20. The rotation of worm 17 causes worm wheel 16 to revolve which carries with it the central portion 6, arms 7, central portion 8, arms 9, platform 10, the heads and mechanism mounted thereon, as well as the casings 12 and 14. The rotation of the arms 7, of course, carry with them the platforms 33. All this will be understood from Fig. 2 in which it is pointed out that the base plate and central spindle 5, together with the valves 120 and 123 are stationary. The rotation of the device looking down on it is in a clockwise direction. Gear 20 drives shaft 22 causing the rotation of the star wheel 36 and the movement of belt 52 to the right, Fig. 4, through the agency of shaft 61, gears 62 and 63, and sprocket wheel 53. The cans are fed onto the moving belt by any suitable means between guides 49 and are carried by the belt towards the right. The stops 51 and 50 operate conjointly as described above to feed the cans one at a time to the point indicated at C' in Fig. 4 where the revolving star wheel 36 picks it up and advances it between the guides 48 onto the platform 33 against the stop 34.

It is of course apparent that all this mechanism is so proportioned that the parts operate in timed relation to give this result. It is to be remembered that the table 10 is slowly revolved at the same rate of speed as the platforms 33. Also the heads 88 are arranged one over each platform 33 and are mounted on the table 10 so as to move therewith. The table 10 continues to revolve and roller 30 on the bottom end of the particular platform which just received a can begins to ride up an incline on the cam surface 27, so as to raise the platform and the container mounted and centered thereon. The container rises until the central vertical valve portion 152 moves between the jaw members 103 of the chuck, Fig. 12. During this operation the chuck jaws are fully open permitting ready insertion of the valve projection. As the valve moves between the jaw members, the flattened end 110 of rod 101 contacts with the raised central portion of the valve 154 so that when the container is fully within the chuck jaws rod 101 will have raised valve 102 off its seat. At this time roller 30 has reached the highest point on cam 27. The spring pressed valve 102 is provided to prevent the escape of steam should any of the chucks not receive a can for any reason. The platform continues to revolve until roller 39 on the corresponding lever 38 and shaft 37 reaches the part 40ᵃ of the cams 40, Fig. 19. This causes a counter-clockwise rotation of shaft 37, causing a similar clockwise rotation of lever 80, Fig. 9. As a result, shaft 81 moves to the right drawing the links 90 and 91 to the right (Fig. 12) to cause the sleeve 106 to slide downwardly so that the cam 107 engages the projections 105 on the clutch jaws 103, forcing them inwardly. The lower inner edge of these clutch jaws, as is apparent in Fig. 11, form substantially a circle to engage around the periphery of the projection 152 at the point 151 to securely hold the container without squeezing it inwardly. The top edge of the projection 152 of the container contacts with the seat 97ᵃ of the head. Roller 30 now leaves cam 27, permitting the platform 33 to descend leaving the container supported entirely by the chuck.

Continued movement of table 10 now effects the following operations. To understand this reference is made to Fig. 40. In this figure, it will be remembered that casing 13, due to the rotation of the machine, is moving in a clockwise direction. As a result the passages to pipes 115 are being exposed one at a time to the passages 132 in the valve body. The vacuum pump which is connected to pipe 127, Fig. 13, is running and connection is established from pipe 127 through passage 126, passage 130, passage 133 to the pipes 115. The first passage 133 to come in alignment with pipe 115 connected to the head which holds the container as just described is controlled by the needle valve 135, which being the first valve is opened only a slight amount. It will, of course, be understood that if a valve 120 of the construction shown in Fig. 13 is employed the opening 131 will be plugged since the operation of the device is now being given without involving the idea of supplying gas to the containers after they are evacuated.

The next passage 133 which will be exposed to the same pipe 115 has its valve 135 opened a little more than the first one so that when it is connected to the same pipe 115 the suction action through pipe 127 is increased. The next valve 135 will be opened a little more and so on for all the valves that are employed. As shown in Fig. 40 there are only three of these vacuum valves.

The idea of having each valve a little further open than the preceding one is to supply a gradually increasing vacuum so that the material in the container will not be sucked from the containers by the pump action. If the full suction action in pipe 127 was applied directly to the container, the contents of the container would be drawn therefrom in part at least. This is a particularly important feature of the invention when the containers hold powdered materials, such as powdered milk. The pipe 115 which we have been considering of course connects to the head through the flexible hose 109, Fig. 2. This flexible hose is connected, as has been pointed out, to the space in the head below the plug 99 within the projection 97 and above valve 102. However, since valve 102 is opened (it having been displaced by the container) the suction action is exerted through passage 98 and through the valve on the container to the interior of the container. As a result during a portion of the rotation of the machine the contents of the container are being subjected to a gradually increasing vacuum until the container has been evacuated to the desired predetermined degree.

At this point roller 43 on arm 42 strikes the fixed cam surface 112 causing it to rotate in a clockwise direction. As a result the toothed member 83 moves in a clockwise direction causing the head through the agency of gear 84 to rotate in a clockwise direction when viewing the head as in Fig. 10. These parts are so proportioned that the head revolves through 180° so that the can is completely inverted. When the can has been completely inverted steam is supplied through pipe 114, hose 109, and passage 98 to the container.

The delivery of steam to pipe 114 is effected when the peripheral passage 136ᵃ comes in alignment with the particular port for the pipe 114 connected to the head under discussion. Steam is thus supplied throughout a substantial part of one revolution of the device as will be apparent from the length of the groove 136ᵃ, Fig. 39. This inversion of the container also represents an important feature of this invention since it has been found that the contents of the container may be sterilized by steam much more quickly than is the case when the container is not inverted. The steam is delivered directly to the material and flows up through it in a manner which causes it to rapidly permeate the contents of the container and raise them to sterilizing heat.

During the steaming action, roller 43 strikes a cam 112' which causes the head to rotate back through its path of 180° to return the container to its original vertical position. Roller 39 then reaches jog 40ᶜ in the cams 40, which causes a further counter-clockwise rotation of shaft 37 causing rod 81 to move further to the right, so that sleeve 106 descends to a point where the clutch fingers 103 press at the point 151 of the valve with sufficient force to squeeze it inwardly to the position shown in Fig. 37, which seats the valve in the sealing compound and seals it. The heat during the steam processing operation softens the sealing compound so that the valve is firmly seated in it.

Continued rotation of the table causes the rollers 39 to strike jog 40ᵇ in cams 40 which moves rod 81 to the left raising the sleeve 106, so that the chuck will release the container which is now fully open and remains so until it grips another container. At this point the roller 30 has come onto the part 27ᵃ of cam 27, Fig. 18, so that the platform 33 is raised to again receive the can. When the chuck opens the can is free to descend with the platform 33 as the roller 30 moves to the part 27ᵇ of the cam 27. At this time the can has reached the point, Fig. 3, where the star wheel 36 may intercept it and move it onto platform 46ᵃ between the guides 47. The star wheel continues to move the can until it is on the belt 57, which conducts it away for packing.

This device is also adapted to vacuumize, gas and seal containers. By gassing I mean to introduce a suitable inert gas into the container after the air has been removed therefrom. In this operation a valve of the type shown in Figs. 25 and 28 is used, in which two of the passages 132 are provided with the auxiliary passage 131, which are connected by means of pipes to any suitable source of gas. These two passages 132 would have the valves 134 therein adjusted so that they are seated to close off passage 130, so that the vacuum could not act through them nor the gas escape during the gassing action.

Thus in the use of this machine the cans would be fed to the platforms, grasped by the chucks, vacuumized to the desired degree, and then a gas supplied thereto. The container would then be sealed and removed from the machine by the star wheel. In this case only one valve is necessary although if desired the vacuumizing and gassing valves could be separate, the gassing valve being in the place of the steam valve in the first form of the machine. If desired, in order to break any vacuum that might exist in the pipe system and in the passage in the head, the passages 140 and 141 are supplied in order to expose the pipes and passages in the heads to atmosphere to admit atmospheric pressure. This is particularly necessary where in processing containers it is only desired to vacuumize and seal them without introducing the steam or other gas.

Carrying out the operation where the container is vacuumized and supplied with gas only it is apparent that the heads do not need to be rotatable so that a simplified form is employed as disclosed in Figs. 32, 33 and 34. The head here comprises the support 160 having the spaced parts 160ᵃ on which are pivotally mounted on the pivot pin 163 the links 164. Links 164 are pivotally connected to the head 166 on shaft 162 by means of pivot pin 165. The links 167 are also pivotally connected to pivot pin 165 and to the shell 169 at the point 168. The chuck and jaws are shown generally at 170. The shaft 162 corresponds to shaft 81 in the rotatable type of head. The pipe for vacuumizing and gassing is connected to the threaded opening 171. The interior construction of the chuck is the same as that in the other form.

The feature of the inversion of the container during the step of injecting steam or any other gas, hot or cold, is emphasized since it is by means of this feature that the highly efficient results of this invention are secured. Although in the case of vacuumizing and gassing of any dry product, like powdered milk, fairly good work can be secured by vacuumizing and gassing the containers right side up.

It may be pointed out here that it is not always necessary in the steam process to vacuumize all products. In a large variety of products a substantial percentage of free gases can be removed from the products and the containers therefor by running the containers through what is commonly called the steam exhaust box in which jets of live steam are projected against the containers as they travel through it. This expands the product and the free gases therein to a certain extent so that a considerable portion of these free gases are forced out of the containers. This step is used on a great many products and eliminates the necessity of vacuumizing the containers with a pump. These hot containers may then be picked up by the machine of this invention, inverted, and steam under pressure forced into the cans and their contents thoroughly sterilizing them.

In the process of vacuumizing and gassing some products it is desirable to force the gas into the containers under pressure and seal them. This pressure may vary from atmospheric up to any desired number of pounds per square inch. For example, this step is of particular value in connection with the canning of coffee, nuts, and similar products. The vegetable oils of these products volatilizes very rapidly once they exude therefrom but are slow to exude against a slight gas pressure. Therefore, a pressure of five pounds gauge per square inch of nitrogen or other suitable inert gas pumped into the container after the oxygen is removed prevents the loss of flavor or aroma of the material and the rancidity thereof. Some products would, of course, require higher pressure than five pounds per square inch and some less.

In general then the device of this invention is adapted to vacuumize, sterilize and seal containers employing one valve for the vacuumizing operation and another for the sterilizing operation. In addition, by simply changing the vacuumizing valve the device may be used to both vacuumize and gas with a single valve, or, if desired, the container can be vacuumized with one valve and gassed with another valve. To simplify the machine when only vacuumizing and gassing are carried out the simple form of non-rotatable head may be used, and gas sealed in containers at or above atmospheric pressure.

As will be apparent from the foregoing disclosure, I have embodied certain principles of construction and operation in physical form which may be modified and changed by those skilled in the art in many respects without departing from these principles. I do not, therefore, desire to be strictly limited to this illustrative disclosure but rather to the spirit and scope of the claims appended below.

What I seek to secure by United States Letters Patent is:

1. In a device of the type described adapted to continuously vacuumize, sterilize and seal valved containers, the combination comprising a support for the container, means for feeding the containers one at a time to the support, means over said support for grasping the container at the valved portion, means for operating said grasping means to close the valves and operating in conjunction with said means for vacuumizing, sterilizing and sealing said containers, and means for releasing the container from said means for grasping it.

2. In a device of the type described for continuously processing valved containers, the combination comprising means for gripping said containers at the valved portion and forming an airtight connection therewith, and means for continuously and successively vacuumizing and sterilizing said containers through their valves, and means for pressure sealing the containers at the valves.

3. In a machine of the type described adapted to process a container having a valve therein in the form of a projection, the combination comprising a rotatable head having a chuck, means for feeding containers to said chuck one at a time, so that it is grasped thereby at the valved projection, means for vacuumizing the container through said head, means for rotating said head, means for delivering sterilizing agents to said container after the head is rotated, and means forming part of said head and chuck for sealing the container.

4. In a device of the type described adapted to process valved containers, a combination comprising means for supporting said containers by the valve, means for vacuumizing and sterilizing said containers, and means operating in conjunction with said supporting means for sealing said containers.

5. In a device of the type described adapted to process containers each having a valve mounted in a projection thereof, the combination comprising a movable platform for supporting the containers, means over said platform for grasping each container by the valved projection when said platform is raised, means including a valve connected to said means for grasping the containers for vacuumizing them through their valves, means including a valve for supplying a heated fluid to said containers through said means for grasping the valved projections, and means operating in conjunction with said means for grasping the valved projections for sealing the valves.

6. In a device of the type described adapted to process containers each having a valve mounted in a projection thereof, the combination comprising a movable platform for supporting the containers, means over said platform for grasping each container by the valved projection when said platform is raised, means including a valve connected to said means for grasping the projections for vacuumizing them through their valves, means including a valve for supplying a heated fluid to said containers through said means for grasping the valved projections, means for rotating said means for supporting the containers during the step of supplying the heated fluid thereto so as to invert the containers, said means also acting to return the containers to original position, and means operating in conjunction with said means for grasping the containers at the valved projections for sealing the valves, said elements acting continuously and in succession.

7. In a continuously operable machine for the purpose described adapted to process containers each having a valved projection, the combination comprising a head for gripping a container at the valved projection, means for feeding the containers to said head one at a time, means connected to said head for vacuumizing and sterilizing the contents of the container through the valved projection, and means for sealing the container by closing the valve.

8. In a machine for the purpose described adapted to process containers each having a valved projection, the combination comprising a head for gripping a container at the valved projection, means for feeding the containers to said head one at a time, means connected to said head for vacuumizing and sterilizing the contents through the valved projection, and means cooperating with said means for sealing said container by compressing the base of the valved projection.

9. In an apparatus for the purpose disclosed adapted to process containers each having a valved projection, the combination comprising a head having a chuck therein, means for feeding the containers one at a time, to said head so that each is gripped by said chuck at its valved projection, means within said head for holding the valve open, means including a valve connected to said head for vacuumizing the contents of the container, means for rotating said head so as to invert the container, means including a valve connected to said head for supplying heated sterilizing medium to said container, means for rotating said head back to place the container in original position, and means connected to said chuck for sealing the container by compressing the valved projection at its base.

10. In a machine for the purpose disclosed, adapted to process containers having valved projections, the combination comprising a rotatable support, a plurality of heads on said support each having a chuck therein, platform means under each of said heads, means for feeding containers to said platforms one at a time, means for raising said platform so that the valved projection of each container lies within a chuck, means for operating the chucks to grip the valved projections, means within each head for holding the valve of the container open, means connected to said head for vacuumizing the container, and means connected with each chuck for sealing the container.

11. In a machine for the purpose disclosed adapted to process containers each having a valved projection, the combination comprising a rotatable support, a plurality of heads on said support each having a chuck, a platform means under each of said heads, means for feeding containers to said platforms one at a time, means for raising each of said platforms so that the valved projection of the container thereon lies within a chuck, means for operating each chuck to grip the valved projection, means within said head for holding the valve of the container open, means connected to said head for vacuumizing the container, means connected to said head for supplying a fluid to said container, and means connected to said chuck for sealing the said container by compressing the valved projection at its base.

12. In a machine for the purpose disclosed adapted to process containers having valved projections, the combination comprising a rotatable support, a plurality of heads on said support each having a chuck, a platform means under each of said heads, means for feeding containers to said platforms one at a time, means for raising said platforms so that the valved projection of the containers thereon each lies within a chuck, means for operating each chuck to grip the valved projection, means within said head for holding the valve of the container open, means connected to said head for vacuumizing the container, means for rotating said head to invert the container, means connected to said head for supplying a fluid under pressure to the container while it is inverted, and means for rotating the head back to its original position.

13. In a machine for the purpose disclosed adapted to process containers having valved projections, the combination comprising a rotatable support, a plurality of heads on said support each having a chuck, a platform means under each of said heads, means for feeding containers to said platforms one at a time, means for raising said platforms so that a valved projection lies within a chuck, means for operating each chuck to grip the valved projection, means within said head for holding the valve of the container open, means connected to said head for vacuumizing the container, means for rotating said head to invert the container, means connected to said head for supplying a fluid under pressure to the container while it is inverted, means for rotating the head back to its original position, means for releasing said chuck to permit the container to rest on said platform, and means for removing the container from the platform.

14. In a head of the type described for compressing the valve of valved containers, the combination comprising a support, a member rotatably mounted on said support, a hollow projection secured to said member, a chuck mounted on said hollow support, means connected to said chuck for operating it, and a valve within said passage adapted to be opened when said chuck grips the valved container.

15. In a machine for the purpose disclosed adapted to process containers each having a valved projection, the combination comprising a rotatable spider, a plurality of heads having chucks therein mounted on said spider, means for feeding valved containers to said chucks one at a time, means for causing each chuck to grasp a container at the valved projection as it is fed to it, vacuumizing and sterilizing means including fixed valves connected to said heads, and means to rotate said spider whereby the containers may be vacuumized and sterilized rapidly, successively and continuously.

16. In a machine for the purpose disclosed adapted to process containers each having a valved projection, the combination comprising a rotatable spider, a plurality of heads having chucks therein mounted on said spider, means for feeding valved containers to said chucks one at a time, means for causing said chucks to grasp the containers at the valved projections, means including fixed valves connected to said heads, means to rotate said spider whereby the containers may be vacuumized and sterilized, and means connected to said chucks for causing them to seal the containers by compressing the bases of the valved projections after the containers are vacuumized and sterilized.

17. The method of processing valved containers, comprising the steps of supporting the containers by their valves, vacuumizing them through their valves, supplying an inert gas under pressure to the container through their valves, and sealing the containers by closing the valves.

18. In a machine for the purpose disclosed adapted to process valved containers, the combination comprising a chuck for grasping the containers at the valve one at a time, means for operating the chuck a predetermined distance to firmly grip a container at the valve, means connected to said chuck by means of which the container is vacuumized and sterilized, and means connected to said means for operating the chuck for further closing it, to seal the container by compressing the valve at its base thereby permanently sealing the container.

19. The method of processing valved containers comprising the steps of gripping the container at its valved portion while forming an air tight connection therewith vacuumizing the container through its valve and compressing the valve at a point where it is gripped sufficiently to permanently close the valve.

20. The method of processing valved containers comprising the steps of gripping the container at its valved portion while forming an airtight connection therewith, vacuumizing the container through its valve, supplying a gas to the container through its valve, and compressing the valve to close it.

21. In a method of processing containers, comprising the steps of gripping the containers to form a seal therewith, inverting the containers and blowing a sterilizing medium into them.

22. In a method of processing containers and their contents comprising the steps of gripping the containers to form a seal therewith, inverting the containers and blowing a sterilizing medium into the containers while being inverted and while inverted.

23. A head of the type described comprising a support, a hollow spindle and extension and a frame rotatably mounted in said support, a chuck attached to said extension, and means operating through said spindle for operating said chuck, said spindle, extension and frame being rotatable to move the chuck in a plane at right angles to the spindle axis.

24. A head of the type described comprising a supporting body having a hollow extension, a chuck attached to said extension, a valve in said extension arranged to be operated when the chuck grips an object, and means for opening and closing the chuck.

25. A head of the type described comprising a supporting body having a hollow extension, a chuck attached to said extension, a valve in said extension arranged to be operated when the chuck grips an object, and means including links and a rod for operating said chuck.

26. A head of the type described comprising a support having a hollow extension, a valve in said extension, a chuck composed of a plurality of fingers, means for imparting motion to the chuck fingers, and a member for operating the valve when an object is grasped by the chuck fingers.

27. In a method of processing valved containers, the steps of forming a seal between the valve and a conduit, withdrawing gas from the upper part of the container, moving the container about a horizontal axis to invert the container and sterilizing the contents of the container by introducing a sterilizing medium under pressure while the latter is inverted.

28. In a device of the type described for processing valved containers, a sealed conduit, means for making a sealed connection between the conduit and the valve of a valved container, means cooperating with the container for moving the latter about a horizontal axis, and means cooperating with the seal for withdrawing gas from the container in one position of the latter and for introducing a sterilizing medium into the container when the latter is in a different position.

29. In a continuously operable machine for the purpose described adapted to process containers each having a valve, the combination comprising a head, carrying conduit means for vacuumizing and sterilizing the contents of the container through the valve, means on said head and engageable with the container for making sealing contact between the conduit means of the head and the container valve, and means for sealing the container by closing the valve.

30. In a continuously operable machine for the purpose described, adapted to process containers each having a valved projection, the combination comprising a head, carrying conduit means through which the contents of the container may be vacuumized and sterilized, means mounted on said head and engageable with the valved projection of the container for making sealing contact between the conduit means of the head and the container at the valved projection, and means for closing the valve to seal the container.

31. The method of processing containers having a projection housing a valve, the steps of gripping the projection to form a seal therewith, vacuumizing the container through the valve and compressing the projection at its base to force the valve on its seat.

32. The method of processing containers having a projection housing a valve, the steps of gripping the projection to form a seal therewith, supplying a gas to the container through the valve and applying pressure to the projection to seat the valve.

33. In a method as described for processing containers having a projecting housing and a valve therein, the steps of contracting the housing at its base to hold the valve in seated container sealing position.

34. In a method of processing containers having a projecting housing and a valve therein, the steps of establishing contact between a conduit and the projecting housing, vacuumizing the container through the conduit and housing and compressing the housing to lock the valve on its seat.

35. In a method of processing containers having a projecting housing, a valve, the steps of establishing communication between a conduit and the housing, supplying a gas to the container through the conduit and housing, and applying pressure to the projection to seal the valve.

WILLIAM B. FENN.